United States Patent
Lee et al.

(10) Patent No.: US 10,447,323 B2
(45) Date of Patent: Oct. 15, 2019

(54) BYPASS PATH LOSS REDUCTION

(71) Applicant: Skyworks Solutions, Inc., Woburn, MA (US)

(72) Inventors: Junhyung Lee, Lake Forest, CA (US); Bipul Agarwal, Irvine, CA (US); Yong Hee Lee, Tustin, CA (US); Junwon Heo, Irvine, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

(21) Appl. No.: 15/809,231

(22) Filed: Nov. 10, 2017

(65) Prior Publication Data

US 2018/0183477 A1    Jun. 28, 2018

Related U.S. Application Data

(63) Continuation of application No. 14/678,390, filed on Apr. 3, 2015, now Pat. No. 9,847,804.

(60) Provisional application No. 61/986,556, filed on Apr. 30, 2014.

(51) Int. Cl.
| | | |
|---|---|---|
| H04B 1/44 | (2006.01) | |
| H04B 1/18 | (2006.01) | |
| H04B 7/04 | (2017.01) | |

(52) U.S. Cl.
CPC ............ H04B 1/18 (2013.01); H04B 1/44 (2013.01); H04B 7/04 (2013.01)

(58) Field of Classification Search
CPC ..................... H04B 1/44; H04B 7/04
See application file for complete search history.

(56) References Cited

U.S. PATENT DOCUMENTS

| | | | |
|---|---|---|---|
| 5,909,643 A | 6/1999 | Aihara | |
| 5,969,560 A | 10/1999 | Kohama et al. | |
| 6,118,985 A | 9/2000 | Kawakyu et al. | |
| 6,496,083 B1* | 12/2002 | Kushitani | H01P 1/15 333/103 |
| 8,165,535 B2* | 4/2012 | Ahn | H04B 1/48 343/876 |
| 8,886,136 B1* | 11/2014 | Signoff | H04B 1/44 455/78 |

(Continued)

FOREIGN PATENT DOCUMENTS

| | | |
|---|---|---|
| CN | 1795617 | 6/2006 |
| CN | 1909400 A | 2/2007 |

(Continued)

OTHER PUBLICATIONS

U.S. Appl. No. 14/737,453, filed Jun. 11, 2015.

(Continued)

*Primary Examiner* — Md K Talukder
(74) *Attorney, Agent, or Firm* — Knobbe, Martens, Olson & Bear, LLP

(57) ABSTRACT

Aspects of this disclosure relate to reducing insertion loss associated with a bypass path. In an embodiment, an apparatus includes a first switch having at least two throws, a second switch having at least two throws, a bypass path between the first switch and the second switch, and at least one inductor. The at least one inductor is configured to compensate for capacitance associated with the bypass path to cause insertion loss of the bypass path to be reduced.

20 Claims, 8 Drawing Sheets

(56) References Cited

U.S. PATENT DOCUMENTS

| | | |
|---|---|---|
| 9,123,989 B2 | 9/2015 | Peng et al. |
| 9,634,718 B2 | 4/2017 | Lee |
| 9,847,804 B2 | 12/2017 | Lee et al. |
| 9,853,680 B2 | 12/2017 | Lee |
| 2001/0049265 A1 | 12/2001 | Nakao et al. |
| 2003/0137284 A1* | 7/2003 | DiPiazza ............ H03H 7/20 323/212 |
| 2004/0001020 A1* | 1/2004 | Huettner ............ G01S 7/034 342/174 |
| 2004/0043731 A1* | 3/2004 | Xiong ............ H04B 1/44 455/130 |
| 2004/0087286 A1 | 5/2004 | Inoue et al. |
| 2004/0092243 A1 | 5/2004 | Hey-Shipton |
| 2004/0239442 A1 | 12/2004 | Wilcox |
| 2005/0079847 A1 | 4/2005 | Arafa |
| 2005/0083117 A1 | 4/2005 | Kim et al. |
| 2005/0143024 A1* | 6/2005 | Sung ............ H04B 7/0608 455/101 |
| 2005/0239415 A1* | 10/2005 | Sagae ............ H04B 1/48 455/78 |
| 2006/0109191 A1 | 5/2006 | Shtrom et al. |
| 2007/0281629 A1 | 12/2007 | Ahn et al. |
| 2008/0025359 A1* | 1/2008 | Pezeshki ............ H01S 5/0261 372/38.03 |
| 2009/0180403 A1* | 7/2009 | Tudosoiu ............ H04B 1/006 370/278 |
| 2010/0008338 A1* | 1/2010 | Tsfati ............ H04B 1/006 370/338 |
| 2010/0062727 A1* | 3/2010 | Kemmochi ............ H04B 1/44 455/74 |
| 2010/0194475 A1 | 8/2010 | Okayama et al. |
| 2010/0301942 A1* | 12/2010 | Hasan Abrar ......... H03F 1/0277 330/277 |
| 2011/0105055 A1* | 5/2011 | Ilkov ............ H01P 1/15 455/93 |
| 2011/0159833 A1* | 6/2011 | Kenington ............ H01Q 3/26 455/232.1 |
| 2012/0009886 A1* | 1/2012 | Poulin ............ H04B 1/0064 455/78 |
| 2012/0087282 A1 | 4/2012 | Shibahara |
| 2012/0250614 A1* | 10/2012 | Anekoji ............ H04B 1/001 370/328 |
| 2013/0003617 A1* | 1/2013 | Gudem ............ H04B 1/109 370/277 |
| 2013/0115876 A1* | 5/2013 | McFarthing ....... G06K 7/10158 455/41.1 |
| 2013/0187807 A1* | 7/2013 | Peng ............ H01Q 3/24 342/175 |
| 2013/0194054 A1 | 8/2013 | Presti |
| 2013/0241666 A1* | 9/2013 | Granger-Jones ......... H01P 1/15 333/101 |
| 2014/0043206 A1 | 2/2014 | Ahn et al. |
| 2014/0073371 A1* | 3/2014 | Mujtaba ............ H04W 68/00 455/515 |
| 2014/0086109 A1 | 3/2014 | Bagger |
| 2014/0104132 A1* | 4/2014 | Bakalski ............ H03H 7/38 343/861 |
| 2014/0167878 A1* | 6/2014 | Lee ............ H03H 7/40 333/124 |
| 2014/0256271 A1* | 9/2014 | Kok ............ H04B 1/44 455/78 |
| 2014/0327495 A1* | 11/2014 | He ............ H01H 9/54 333/103 |
| 2015/0085709 A1* | 3/2015 | Lee ............ H04B 1/44 370/278 |
| 2015/0119104 A1* | 4/2015 | Saji ............ H04B 1/40 455/553.1 |
| 2015/0126136 A1* | 5/2015 | Robinett ............ H03F 3/195 455/77 |
| 2015/0126146 A1* | 5/2015 | Wang ............ H04B 1/1027 455/296 |
| 2015/0207536 A1* | 7/2015 | Yehezkely ............ H03H 11/02 455/78 |
| 2015/0311922 A1* | 10/2015 | Bakalski ............ H04B 1/006 455/552.1 |
| 2015/0318889 A1* | 11/2015 | Lee ............ H04B 1/44 455/78 |
| 2016/0119410 A1* | 4/2016 | Ahn ............ H04L 67/10 455/500 |
| 2016/0182037 A1* | 6/2016 | Srihari ............ H03K 17/693 343/858 |
| 2017/0155421 A1* | 6/2017 | Wloczysiak ........ H04B 1/006 |
| 2017/0194918 A1* | 7/2017 | Wallis ............ H03F 1/22 |

FOREIGN PATENT DOCUMENTS

| | | |
|---|---|---|
| CN | 202535327 U | 11/2012 |
| CN | 103441747 A | 12/2013 |
| CN | 103731120 A | 4/2014 |
| DE | 10 2012 100460 | 7/2013 |
| EP | 1 381 162 | 1/2004 |
| GB | 2308744 | 7/1997 |
| GB | 2362046 | 11/2001 |
| KR | 10-2000-0056689 | 9/2000 |
| KR | 10-2013-0016597 | 2/2013 |
| TW | 2013-32215 | 8/2013 |
| TW | I426653 | 2/2014 |
| WO | WO 2013-022237 | 2/2013 |
| WO | WO 2013-081551 | 6/2013 |

OTHER PUBLICATIONS

U.S. Appl. No. 14/737,455, filed Jun. 11, 2015.

Skyworks Solutions, Inc., Product Summary: SKY13569-11: RX Diversity FEM with Gain (B28, B3, and B7), Oct. 24, 2014, 2 pages. Available at: http://www.skyworksinc.com/uploads/documents/SKY13569_11_PS_203360A.PDF (accessed: Jul. 2, 2015).

Skyworks, Product Brief—Diversity Receive Front-end Modules, Feb. 2015, 2 pages. Available at: http://www.skyworksinc.com/uploads/documents/Rx_Diversity_FEMs_PB130_15.pdf (accessed: Jul. 2, 2015).

Sorrentino, et al., "Microwave and RF Engineering", 2010, pp. 363-364, 367-368, 375, 378, 439-440, and 643.

* cited by examiner

BYPASS PATH LOSS REDUCTION

CROSS-REFERENCE TO RELATED APPLICATIONS

This application is a continuation of U.S. patent application Ser. No. 14/678,390, filed Apr. 3, 2015 and titled "BYPASS PATH LOSS REDUCTION", which claims the benefit of priority under 35 U.S.C. § 119(e) of U.S. Provisional Patent Application No. 61/986,556, filed Apr. 30, 2014 and titled "BYPASS PATH LOSS REDUCTION", the entire technical disclosures of each of which are herein incorporated by reference in their entireties.

BACKGROUND

Technical Field

This disclosure relates to electronic systems and, in particular, to radio frequency (RF) electronics.

Description of the Related Technology

A radio frequency (RF) system can include antennas for receiving and/or transmitting RF signals. There can be several components in an RF system that may access the antennas. For example, an RF system can include different transmit and/or receive paths associated with different frequency bands, different communication standards and/or different power modes, and each path may access a particular antenna at certain instances in time.

An antenna switch module can be used to electrically connect an antenna to a particular transmit or receive path of the RF system, thereby allowing multiple components to access the antennas. In certain configurations, an antenna switch module is in communication with a diversity module, which processes signals received and/or transmitted using one or more diversity antennas. The diversity module can include a bypass path that bypasses the receive path and/or transmit path processing of signals in the diversity module.

SUMMARY OF CERTAIN INVENTIVE ASPECTS

The innovations described in the claims each have several aspects, no single one of which is solely responsible for its desirable attributes. Without limiting the scope of the claims, some prominent features will now be briefly described.

One aspect of this disclosure is an apparatus that includes, a first switch having at least two throws, a second switch having at least two throws, a bypass path electrically connecting the first switch and the second switch, and at least one inductor configured to compensate for a capacitance associated with the bypass path to cause insertion loss of the bypass path to be reduced.

The at least one inductor can compensation for at least one of an off state capacitance of the first switch, an off state capacitance of the second switch, or a capacitance of a transmission line of the bypass path.

The at least one inductor can include a first inductor configured to compensate for an off state capacitance of the first switch. The off state capacitance of the first switch can include an off state series capacitance and an off state shunt capacitance. The first switch can be coupled between the first inductor and the bypass path. The at least one inductor can also include a second inductor configured to compensate for an off state capacitance of the second switch. The at least one inductor can also include a third inductor configured to compensate for a capacitance of a transmission line of the bypass path.

The apparatus can also include a radio frequency signal path electrically coupled between the first switch and the second switch, in which the radio frequency signal path configured to process a radio frequency signal. The first switch can be configured to electrically connect an antenna port to the bypass path and electrically isolate the antenna port from the radio frequency signal path in a first state, and the first switch can be configured to electrically connect the antenna port to the radio frequency signal path and electrically isolate the antenna port from the bypass path in a second state. The radio frequency signal path can be a receive path. The radio frequency signal path can be a transmit path.

The apparatus can include a diversity module. The diversity module can include at least the first switch, the second switch, and the bypass path. The diversity module can also include the at least one inductor. The apparatus can further include a plurality of antennas, in which the plurality of antennas includes a diversity antenna in communication with the first switch of the diversity module. The apparatus can further include an antenna switch module in communication with the second switch.

Another aspect of this disclosure is an apparatus that includes a first switch having at least two throws, a second switch having at least two throws, a radio frequency signal path, a bypass path, and an inductor. The radio frequency signal path is electrically coupled between the first switch and the second switch. The radio frequency signal path is configured to process a radio frequency signal. The bypass path is electrically coupled between the first switch and the second switch. The inductor is configured to compensate for an off state capacitance of the first switch to cause insertion loss associated with the bypass path to be reduced.

The apparatus can further include a second inductor configured to compensate for an off state capacitance of the second switch to cause insertion loss associated with the bypass path to be reduced. The apparatus can further include a third inductor configured to compensate for a capacitance of the bypass path to cause insertion loss associated with the bypass path to be reduced.

The inductor can have a tunable inductance. The inductor can be configured as a shunt inductor. The first switch can be coupled between the inductor and the bypass path.

The apparatus can further include receive paths between the first switch and the second switch, in which the receive paths include the radio frequency signal path. The first switch can be configured to electrically connect an antenna port to the bypass path and electrically isolate the antenna port from the receive paths in a first state. The first switch can be configured to electrically connect the antenna port to a selected one of the receive paths and electrically isolate the bypass path from the antenna port and other receive paths of the receive paths in a second state.

Another aspect of this disclosure is an electronically-implemented method of reducing insertion loss associated with a bypass path. The method includes operating a diversity module in a bypass mode such that an input of the diversity module is coupled to an output of the diversity module by way of a bypass path that electrically connects a first switch having at least two throws with a second switch having at least two throws. The method also includes, while operating the diversity module in the bypass mode, substantially canceling capacitance associated with the bypass path to cause insertion loss associated with the bypass mode to be reduced.

Another aspect of this disclosure is an apparatus that includes a bypass path, a receive path, and at least one inductor. The bypass path electrically connects a first switch coupled to an antenna port with a second switch coupled to an antenna switch module, in which the first switch having at least two throws, and the second switch having at least two throws. The receive path is electrically coupled between the first switch with the second switch. The receive path includes a filter and a low noise amplifier. The at least one inductor is configured to compensate for capacitance associated with at least one of an off state of the first switch, an off state of the second switch, or a transmission line of the bypass path.

Another aspects of this disclosure is an apparatus that includes a first switch having at least two throws, a second switch having at least two throws, a receive path electrically connecting the first switch and the second switch, a bypass path electrically connecting the first switch and the second switch, a first inductor, a second inductor, and a third inductor. The first inductor is configured to compensate for an off state capacitance of the first switch to cause insertion loss associate with the bypass path to be reduced. The second inductor is configured to compensate for a capacitance of a transmission line of the bypass path to cause the insertion loss associate with the bypass path to be reduced. The third inductor is configured to compensate for an off state capacitance of the second switch to cause the insertion loss associate with the bypass path to be reduced.

Another aspect of this disclosure is an apparatus that includes a transmission line and at least one inductor. The transmission line electrically connects a first multi-throw switch with a second multi-throw switch. The at least one inductor is configured to compensate for a capacitance associated with the transmission line to cause insertion loss of the transmission line to be reduced.

The at least one inductor can compensate for capacitance of at least one of an off state capacitance of the first multi-throw switch, an off state capacitance of the second multi-throw switch, or a capacitance of the transmission line to cause insertion loss of the transmission line to be reduced.

Another aspect of this disclosure is an apparatus that includes a transmission line electrically connecting a first multi-throw switch and a second multi-throw switch and at least one inductor configured to compensate for an off state capacitance of the first multi-throw switch and an off state capacitance of the second multi-throw switch.

For purposes of summarizing the disclosure, certain aspects, advantages and novel features of the inventions have been described herein. It is to be understood that not necessarily all such advantages may be achieved in accordance with any particular embodiment of the invention. Thus, the inventions may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will now be described, by way of non-limiting example, with reference to the accompanying drawings, in which.

DETAILED DESCRIPTION OF CERTAIN EMBODIMENTS

Figure 1:
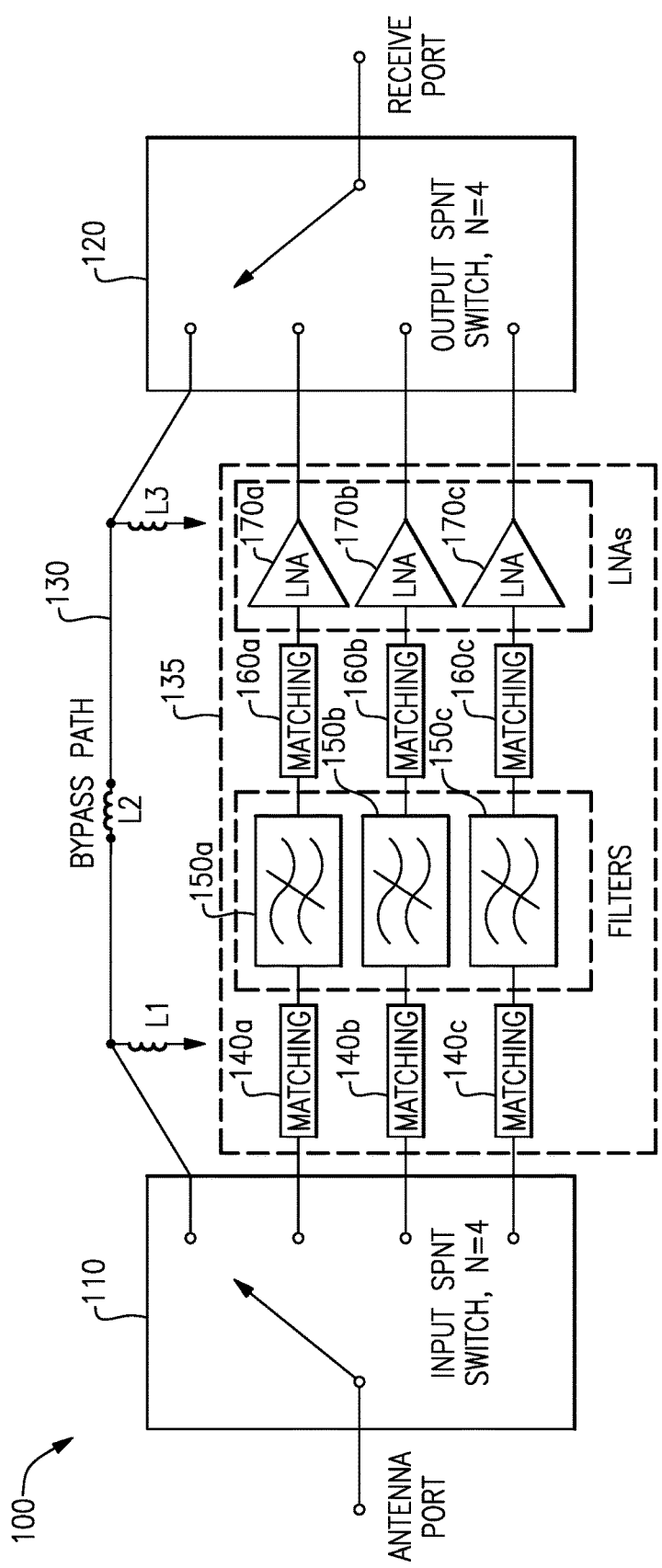
FIG. 1 is a schematic diagram of a diversity module according to an embodiment.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that embodiments can include more elements than illustrated in a particular drawing and/or a subset of the illustrated elements.

Some wireless devices, such as handsets, can include a plurality of antennas including at least a primary antenna and a diversity antenna. Wireless devices configured to receive and/or transmit signals in accordance with the Long Term Evolution (LTE) standard assume that a device includes at least two receive antennas. With multiple antennas, signals can be received at more than one physical location. To improve reception, signals from multiple antennas at different physical locations can be combined. In certain configurations, the primary antenna can be located physically close to a receive chip set and the diversity antenna can be located spaced apart from the primary antenna for physical diversity. With the diversity antenna being located relatively far from the receive chip set, signals received at the diversity antenna can experience loss through cable and/or other wiring connecting the diversity antenna to the receive chip set. In some instances, such a cable can result in a loss of about 2 decibels (dB).

It can be desirable for signals associated with the diversity antenna to have approximately the same signal strength as signals associated with the primary antenna. Accordingly, a diversity module can provide a gain to compensate for losses on signals received by the diversity antenna, such as losses from cables or other wiring. The diversity module can include one or more receive paths that each includes a filter and a low noise amplifier. For instance, the diversity module can include a plurality of receive paths that each include a band pass filter configured to pass a different frequency band and a low noise amplifier configured to amplify an output of a respective band pass filter.

The diversity module can also include a bypass path that avoids processing, such as filtering and amplification, of a signal associated with the diversity antenna. The bypass path can function as a transmission line that avoids the filtering and amplification of the one or more receive paths of the diversity module. For instance, when a signal received from the diversity antenna is outside of a pass band of a filter of any of the one or more receive paths (for example, outside of a pass band of a band pass filter of any of the one or more receive paths), it can be desirable to bypass the one or more receive paths with the bypass path. The bypass path can provide a signal received from the diversity antenna to an antenna switch module without filtering and/or adding a gain. The antenna switch module can then process signals associated with the diversity antenna and provide the processed signals to a receiver and/or a transceiver. In some applications, the bypass path can be used to transmit signals using the diversity antenna. In such applications, an antenna switch module can provide an RF signal to the diversity module to transmit from the diversity antenna by way of the bypass path.

In a diversity module, it can be desirable for a bypass path to have as low of an insertion loss as possible over a relatively wide frequency range (e.g., a frequency range spanning several GHz or a frequency range spanning at least about 10 GHz). With a relatively low insertion loss, the bypass path can provide a low loss receive path and/or a low loss transmit path.

Capacitances in the diversity module can result in insertion loss in a bypass path. Such capacitances can result from capacitive loading of the transmission line of the bypass path and/or of one or more switches of the diversity module. For instance, a multi-throw switch can couple an RF signal to a bypass path. In this example, off state capacitances associated with throws that are unconnected to the bypass path can create undesirable capacitance in the bypass path. The capacitance associated with one or more switches and/or the transmission line of the bypass path can be significant and can result in increased insertion loss. This increased insertion loss can have a more pronounced effect at higher operating frequencies. For instance, absent compensation, parasitic capacitance associated with one or more switches and/or the transmission line of the bypass path can significantly affect insertion loss at frequency of at least about 2 GHz in certain applications.

Aspects of this disclosure relate to compensating for capacitances that can cause insertion loss in a bypass path, such as a bypass path in a diversity module. One or more inductors can compensate for some or all of the capacitance that causes insertion loss in the bypass path. Accordingly, the one or more inductors can reduce insertion loss of the bypass path. Such compensation can be present over a relatively wide frequency range, such as a frequency range of several to tens of GHz. In one embodiment, a bypass path electrically connects a first switch with a second switch, a first inductor can substantially cancel an off state capacitance of the first switch, a second inductor can substantially cancel a capacitance of the bypass path, and a third inductor can substantially cancel an off state capacitance of the second switch.

With the one or more inductors to compensate for capacitance that can cause insertion loss on the bypass path, the length of the transmission line in the bypass path can contribute relatively less to insertion loss. Accordingly, such a transmission line can have a longer length without significantly impacting insertion loss of the bypass path due to compensation by the one or more inductors. Alternatively or additionally, switch size of the first switch and/or the second switch that are connected by the bypass path can have less of an effect on insertion loss compared to previous designs due to inductive compensation for the off state switch capacitances.

While this disclosure may describe examples in diversity modules of wireless devices for illustrative purposes, the principles and advantages described herein may be applied to other suitable applications. Moreover, while features of this disclosure may be described with reference to receiving RF signals for illustrative purposes, any of the principles and advantages discussed herein can be applied in connection with a circuit configured to transmit RF signals, a circuit configured to receive RF signals and/or a circuit configured to both transmit and receive RF signals. For instance, the principles and advantages discussed herein can be applied to any context where there is a bypass path electrically between two multi-throw switches and also a radio frequency signal path electrically coupled between the two multi-throw switches, in which the radio frequency signal path can process a radio frequency signal for receiving or transmitting.

FIG. 1 is a schematic diagram of a diversity module 100 according to an embodiment. The diversity module 100 and/or any of the diversity modules referenced herein can be implemented in a wireless device, such as a mobile device, for example. For instance, the diversity module 100 can be implemented in a smart phone. The diversity module 100 and/or any of the other diversity modules can include more or fewer elements than illustrated. The diversity module 100 can receive an RF signal from a diversity antenna and provide a processed version of the received RF signal to a receive port. In some instances, the diversity module 100 can also be used to transmit an RF signal using the diversity antenna. The illustrated diversity module 100 includes a first switch 110, a second switch 120, a bypass path 130, and receive paths 135.

The first switch 110 can be an RF switch configured to pass RF signals from an antenna port to the bypass path 130 or to a selected one of the receive paths 135. The first switch 110 can be bidirectional such that the first switch 110 can also provide a signal from the bypass path 130 to the antenna port. The first switch 110 can be considered an input switch for receiving signals from the antenna port. When the first switch 110 is bidirectional, it can be considered an output switch for facilitating transmission of a signal from the antenna port. While features of this disclosure may be described with reference to one antenna port for illustrative purposes, any of the principles and advantages discussed herein can be applied in connection with multiple antenna ports and/or multiple diversity antennas. One or more of the inductors L1, L2, or L3 can be implemented separately in connection with each of a plurality of antennas and/or antenna ports. For instance, in certain applications, one first inductor L1 can be implemented in connection with a first antenna and another first inductor L1 can be implemented in connection with a second antenna. One or more of the inductors L1, L2, or L3 can be implemented to provide inductive compensation associated with a plurality of antennas and/or antenna ports. As one example, one third inductor L3 can be implemented in connection with multiple antennas.

In one state, the first switch 110 electrically couples the antenna port to the bypass path 130 and electrically isolates the antenna port from receive paths 135. Such a state corresponds to a bypass mode. In other states, the first switch 110 electrically couples the antenna port to a selected one of the receive paths 135 and electrically isolates the other receive paths 135 and bypass path 130 from the antenna port.

The first switch 110 can include a shunt element and a switch element associated with each throw. To selectively electrically couple a signal associated with a selected throw to the antenna port, the first switch 110 can turn on the switch element associated with the selected throw, turn off the shunt element associated with the selected throw, turn on the shunt elements associated with the other throws, and turn off the switch elements associated with the other throws. The shunt element and the switch element can each be implemented by one or more field effect transistors, for example. In some implementations, the shunt element can be implemented by two or more field effect transistors in series with each other and/or the series element can be implemented by two or more field effect transistors in series with each other.

The illustrated first switch 110 is a multi-throw switch. The first switch 110 can include two or more throws. For instance, the illustrated first switch 110 includes four throws. The first switch 110 can have any suitable number of throws that is 2 or greater for a particular application. The first switch 110 can have a single pole. In some other embodiments (not illustrated), the first switch 110 can have two or more poles.

The second switch 120 can be an RF switch configured to pass RF signals from the bypass path 130 or a selected one of the receive paths 135 to the receive port. The second switch 120 can be bidirectional such that the second switch 120 can also provide an RF signal to the bypass path 130 to facilitate transmission of the RF signal from the antenna port. The RF signal can be received at the receive port, in which case the receive port can operate as a transmit port in a transmit mode of operation, or another port. For instance, the RF signal can be provided to the receive port by an antenna switch module for transmission via a diversity antenna electrically connected to the first switch 110. In another implementation (not illustrated), the second switch 120 can include a first pole associated with receiving and a second pole associated with transmitting such that either a receive port or a transmit port can be electrically connected to the bypass path 130. The second switch 120 can be considered an output switch for receiving signals from the antenna port. When the second switch 120 is bidirectional, it can be considered an input switch for facilitating transmission from the antenna port.

In a state corresponding to a bypass mode, the second switch 120 electrically couples the receive port to the bypass path 130 and electrically isolates the receive port from the receive paths 135. In other states, the second switch 120 electrically couples the receive port to a selected one of the receive paths 135 and electrically isolates the other receive paths 135 and bypass path 130 from the receive port.

The second switch 120 can include a shunt element and a switch element associated with each throw. To selectively electrically couple a signal associated with a selected throw to the receive port, the second switch 120 can turn on the switch element associated with the selected throw, turn off the shunt element associated with the selected throw, turn on the shunt elements associated with the other throws, and turn off the switch elements associated with the other throws. The shunt element and the switch element can each be implemented by one or more field effect transistors, for example. In some implementations, the shunt element can be implemented by two or more field effect transistors in series with each other and/or the series element can be implemented by two or more field effect transistors in series with each other.

The illustrated second switch 120 is a multi-throw switch. The second switch 120 can include two or more throws. For instance, the illustrated second switch 120 includes four throws. The second switch 120 can have any suitable number of throws that is 2 or greater for a particular application. The second switch 120 can have a single pole. In some other embodiments (not illustrated), the second switch 120 can have two or more poles. The second switch 120 can have a different number of poles and/or throws than the first switch 110 in certain applications.

The bypass path 130 can avoid filtering and amplification of a signal associated with the diversity antenna. The bypass path 130 can function as a transmission line between the first switch 110 and the second switch 120 that bypasses the receive paths 135. Accordingly, a signal can be passed by way of the bypass path 130 from the antenna port to the receive port (or from the receive port to the antenna port) without being processed by any of the receive paths 135.

One or more inductive circuit elements can be included in the diversity module 100 to cause insertion loss associated with the bypass path 130 to be reduced. While the diversity module 100 and the other diversity modules disclosed herein include three such inductors L1, L2, and L3, one or more of these inductors can be included in certain embodiments. Moreover, one or more of the inductors L1, L2, or L3 can be tunable such that the inductance of one or more of the inductors L1, L2, or L3 can be adjusted. For example, any of these inductors can include a base inductor with one or more additional inductors that can be switched in or switch out in parallel with the base inductor to change the effective inductance of the inductor.

In FIG. 1, the illustrated first inductor L1 has a first end coupled to the bypass path 130 and a second end coupled to a ground potential. Accordingly, in FIG. 1, the first inductor L1 is configured as a shunt inductor. The first switch 110 can be disposed between the first inductor L1 and the antenna port. The first inductor L1 can have an inductance selected to compensate for some or all of the off state capacitance of the first switch 110 in bypass mode. Accordingly, the first inductor L1 can substantially cancel effects of off state capacitance from the first switch 110 to reduce or substantially eliminate the effect of such capacitance on insertion loss of the bypass path 130. In some embodiments, the first inductor L1 can also compensate for at least a portion of the capacitance of a transmission line of the bypass path 130.

The illustrated second inductor L2 can be coupled in series in the bypass path 130 between the first switch 110 and the second switch 120. The second inductor L2 can have an inductance to compensate for parasitic capacitance of the transmission line of the bypass path 130. The second inductor L2 can substantially cancel effects of capacitance of the bypass path 130 to reduce or substantially eliminate the effect of such capacitance on insertion loss of the bypass path 130. In some embodiments, the second inductor L2 can also compensate for at least a portion of the off state capacitance of the first switch 110 and/or at least a portion of the off state capacitance of the second switch 120.

The illustrated third inductor L3 has a first end coupled to the bypass path 130 and a second end coupled to a ground potential. As illustrated in FIG. 1, the third inductor L3 is configured as a shunt inductor. The second switch 120 can be disposed between the third inductor L3 and the receive port. The third inductor L3 can have an inductance selected to compensate for some or all of the off state capacitance of the second switch 120 in bypass mode. Accordingly, the third inductor L3 can substantially cancel effects of off state capacitance from the second switch 120 to reduce or substantially eliminate the effect of such capacitance on insertion loss of the bypass path 130. In some embodiments, the third inductor L3 can also compensate for at least a portion of the capacitance of a transmission line of the bypass path 130.

The receive paths 135 can filter and amplify a signal from the antenna port and provide a filtered, amplified signal to the receive port by way of the second switch 120. Each of the receive paths 135 can include a first matching circuit 140a/140b/140c, a band pass filter 150a/150b/150c to filter a signal received from the antenna port by way of the first switch 110, a second matching circuit 160a/160b/160c, and a low noise amplifier 170a/170b/170c to amplify an output from the band pass filter 150a/150b/150c. The band pass filter 150a/150b/150c of each of receive path can pass a different frequency band. Alternatively or additionally, the band pass filter 150a/150b/150c of each of receive path can have different filter characteristics, such as out of band attenuation, etc. Although three different receive paths are illustrated in FIG. 1, any suitable number of receive paths can be implemented. For instance, in certain applications, 1 to 10 receive paths can be included in the diversity module.

While the figures illustrate the receive paths 135 and the bypass path 130 between two multi-throw switches, any of the principles and advantages discussed in this disclosure can be applied to other suitable contexts, such as (1) a bypass path 130 and a single receive path between multi-throw switches; (2) a bypass path 130 and one or more transmit paths between multi-throw switches; and (3) a bypass path 130, one or more receive paths and one or more transmit paths between multi-throw switches.

Figure 2A:
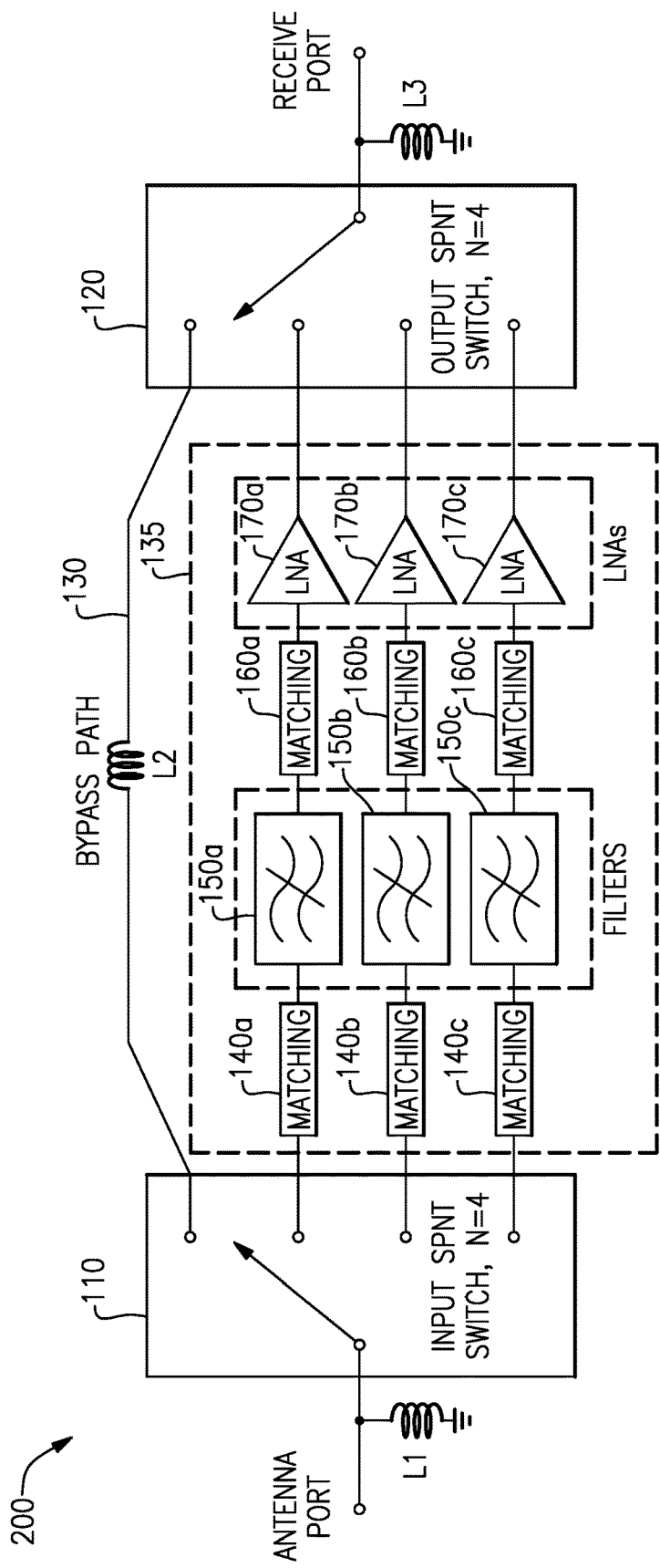
FIG. 2A is a schematic block diagram of a diversity module according to another embodiment.

FIG. 2A is a schematic block diagram of a diversity module 200 according to another embodiment. The diversity module 200 of FIG. 2A is substantially the same as the diversity module 100 of FIG. 1, except that the first inductor L1 and the third inductor L3 are coupled to the bypass path 130 at different nodes. Accordingly, other than the nodes at which the first inductor L1 and the third in inductor L3 are coupled, the diversity module 200 can implement any of the principles and advantages discussed with FIG. 1. As one non-limiting example, the switches 110 and 120 in the illustrated in FIG. 2A can implement any combination of features discussed with reference to FIG. 1. The first inductor L1 of FIG. 2A is coupled on an opposing side of the first switch 110 relative to the embodiment illustrated in FIG. 1 and the third inductor L3 of FIG. 2A is coupled on an opposing side of the second switch 120 relative to the embodiment illustrated in FIG. 1. The first inductor L1 and the third inductor L3 of FIG. 2A are part of the diversity module 200 of FIG. 2A. In the illustrated diversity module 200, the first switch 110 is coupled between the first inductor L1 and the bypass path 130. The inductance of the first inductor L1 can impact both the bypass path 130 and the receive paths 135 in the diversity module 200, as opposed to inductance of the first inductor L1 only having a substantial impact on the bypass path 130 in the diversity module 100. Additionally, in the illustrated diversity module 200, the second switch 120 is coupled between the bypass path 130 and the third inductor 130. The inductance of the third inductor L3 can impact both the bypass path 130 and the receive paths 135 in the diversity module 200, as opposed to inductance of the third inductor L3 only having a substantial impact on the bypass path 130 in the diversity module 100.

In another embodiment, the first inductor L1 can be arranged in accordance with the diversity module 100 as illustrated in FIG. 1 and the third inductor L3 can be arranged in accordance with the diversity module 200 as illustrated in FIG. 2A. Alternatively, the first inductor L1 can be arranged in accordance with the diversity module 200 as illustrated in FIG. 2A and the third inductor L3 can be arranged in accordance with the diversity module 100 as illustrated in FIG. 1.

According to other embodiments, both the first inductor L1 of FIG. 1 and the first inductor L1 of FIG. 2A can be implemented together such that these inductors have a net effect of substantially canceling off state capacitance of the first switch 110. Alternatively or additionally, both the third inductor L3 of FIG. 1 and the third inductor L3 of FIG. 2A can be implemented together such that these inductors have a net effect of substantially canceling off state capacitance of the first switch 120.

One or more of the inductors L1, L2, or L3 can have a tunable impedance. Having a tunable impedance can enable one or more of the inductors L1, L2, or L3 to adjust their impedance to account for variations, such as process variations, in capacitance that can result in insertion loss associated with the bypass path 130. For instance, an inductor with an adjustable impedance can compensation for variations in an off state capacitance of the first switch 110, variations in capacitance associated with the transmission line of the bypass path, variations in off state capacitance of the second switch 120, or any combination thereof. In one embodiment, one or more of the inductors L1, L2, or L3 can be implemented with a tunable capacitance in parallel.

Figure 2B:
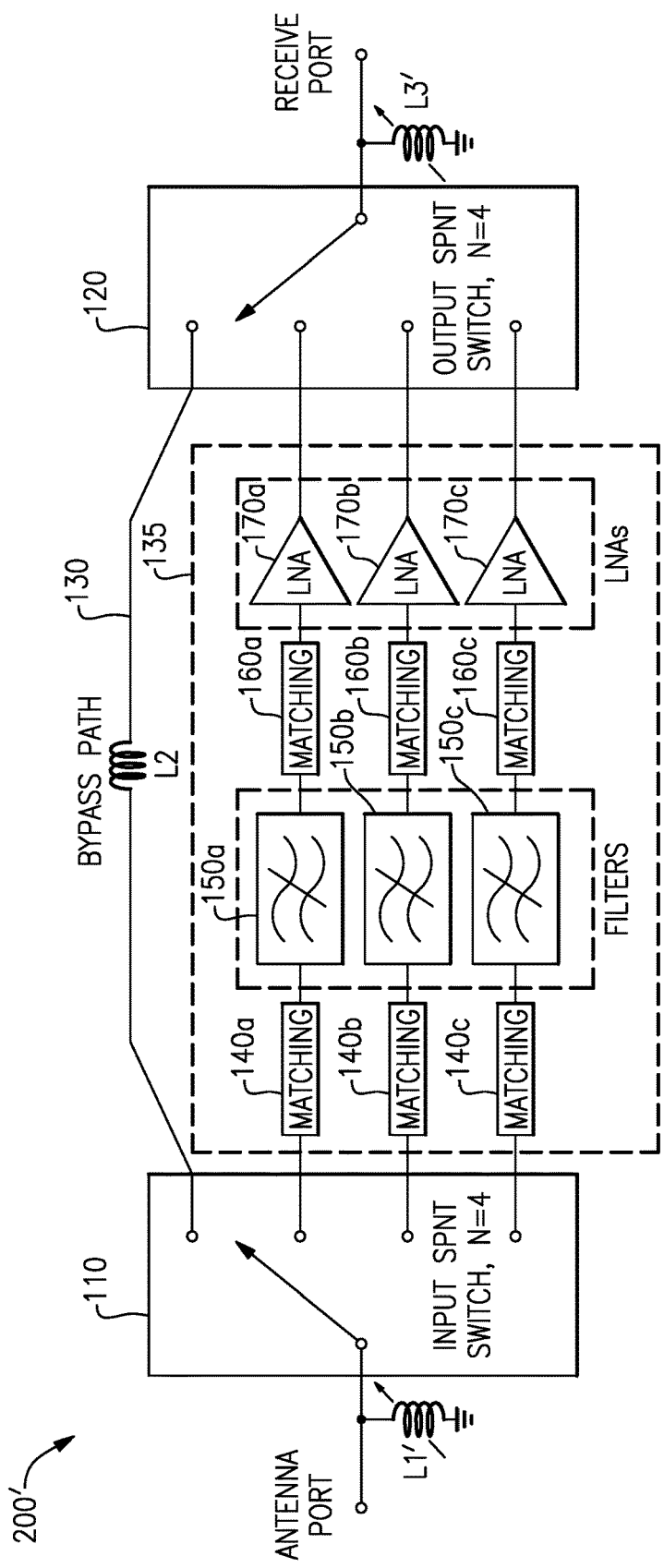
FIG. 2B is a schematic block diagram of a diversity module according to another embodiment.

FIG. 2B is a schematic block diagram of a diversity module 200' according to another embodiment. The diversity module 200' can implement any of the principles and advantages discussed with reference to the diversity module 200 and/or any suitable combination of features discussed with reference to the diversity module 100. The diversity module 200' of FIG. 2B is substantially the same as the diversity module 200 of FIG. 2A, except that the first inductor L1 and the third inductor L3 are illustrated as being tunable inductors L1' and L3' in FIG. 2B. In another embodiment (not illustrated), the second inductor L2 can also be tunable.

The first inductor L1 and the third inductor L3 can each be implemented by any suitable tunable inductance circuit. In some other embodiments, only one of the first inductor L1 or the third inductor can be implemented by a suitable tunable independence circuit. As one example, a tunable impedance circuit can include a base inductor with one or more additional inductors that can be switched in or switch out in series and/or in parallel with the base inductor to change the effective inductance of the inductor. As another example, a tunable impedance can include one or more inductors that can be switched in or switch out in series and/or in parallel with each other.

In certain embodiments, the tunable first inductor L1 can include switches disposed in series between respective inductive elements and the antenna port. One or more of the inductive elements of the tunable first inductor L1 can be selectively electrically coupled to the antenna port to provide a desired effective impedance. In such an embodiment, each inductive element of the first inductor L1 can be electrically isolated from the antenna port in a decoupled state such that the effective inductance of the first inductor L1 can be approximately zero in the decoupled state. Similarly, in certain embodiments, the tunable third inductor L3 can include switches disposed in series between respective inductive elements and the receive port. One or more of the inductive elements of the tunable third inductor L3 can be selectively electrically coupled to the receive port to provide a desired effective impedance. In such an embodiment, each inductive element of the third inductor L3 can be electrically isolated from the receive port in a decoupled state such that the effective inductance of the third inductor L3 can be approximately zero in the decoupled state.

In various embodiments, the tunable first inductor L1 can include a plurality of inductive elements arranged in series with each other between the antenna port and a reference potential, such as ground. Each of the inductive elements can be arranged in parallel with a respective switch. When a respective switch is turned on, the corresponding inductive element can be bypassed. The inductance of the first inductor L1 can be tuned by selectively bypassing one or more inductive elements. Similarly, in certain embodiments, the tunable third inductor L3 can include a plurality of inductive elements arranged in series with each other between the receive port and a reference potential, such as ground. Each of the inductive elements can be arranged in parallel with a respective switch. When a respective switch is turned on, the corresponding inductive element can be bypassed. The inductance of the third inductor L3 can be tuned by selectively bypassing one or more inductive elements.

One or more of the inductors L1, L2, or L3 can be arranged in a variety of ways to compensate for capacitance associated with the bypass path. For example, the inductors L1 and/or L3 can be implemented as shunt inductors as illustrated in FIGS. 1, 2A, and/or 2B or implemented as series inductors as illustrated in FIG. 2C.

Figure 2C:
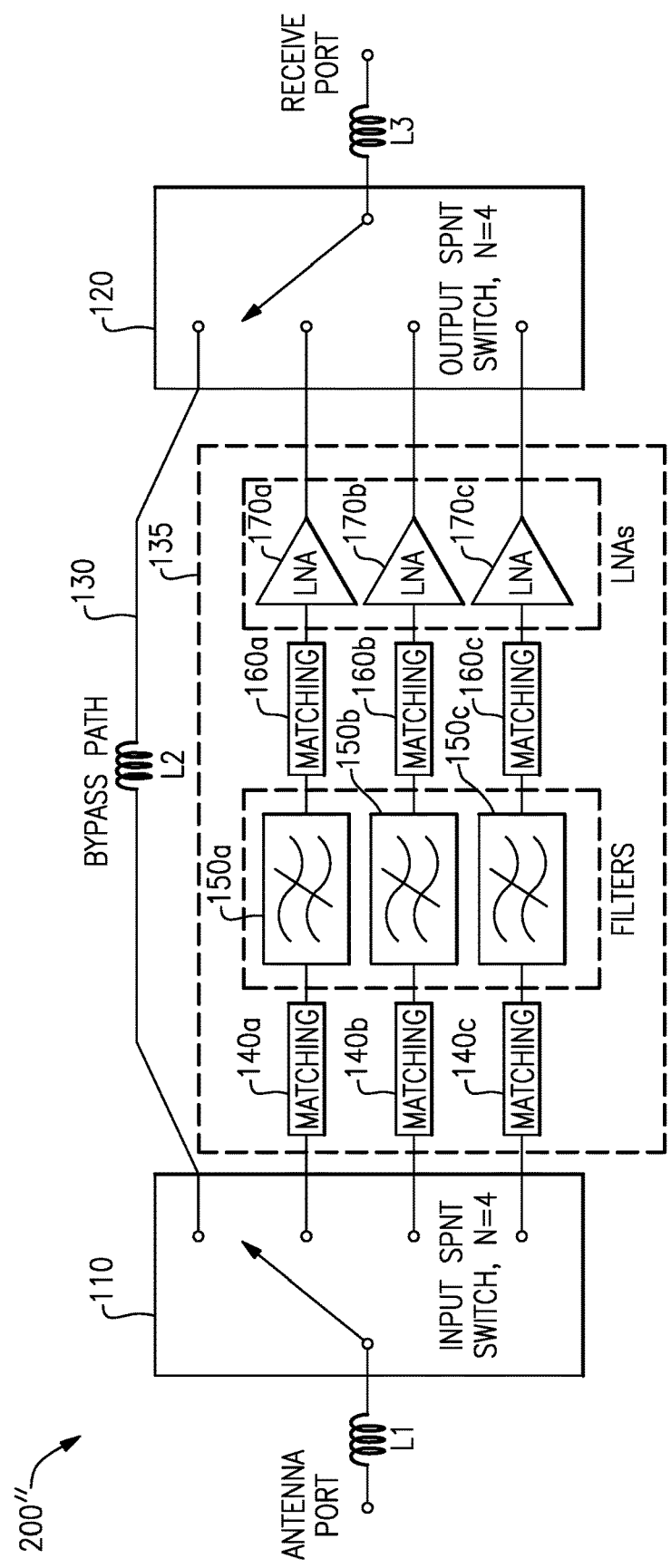
FIG. 2C is a schematic block diagram of a diversity module according to another embodiment.

FIG. 2C is a schematic block diagram of a diversity module 200" according to another embodiment. The diversity module 200" can implement any of the principles and advantages discussed with reference to the diversity module 200 and/or any suitable combination of features discussed with reference to the diversity module 100 and/or the diversity module 200'. The diversity module 200" of FIG. 2C is substantially the same as the diversity module 200 of FIG. 2A, except that the first inductor L1 and the third inductor L3 are arranged as series inductors in FIG. 2C instead of as shunt inductors as illustrated in FIG. 2A. In FIG. 2C, the first inductor L1 is disposed in series between the antenna port and the first switch 110. Similarly, in FIG. 2C, the third inductor L2 is disposed in series between the second switch 120 and the receive port. The inductance of the first inductor L1 in FIG. 2C can be selected such that it substantially cancels on off state capacitance of the first switch 110. The inductance of the third inductor L3 of FIG. 2C can be selected such that it substantially cancels on off state capacitance of the first switch 120.

In another embodiment, the first inductor L1 can be arranged as a series inductor as illustrated in FIG. 2C and the third inductor L3 can be arranged as a shunt inductor as illustrated in any one of FIGS. 1 to 2B. In another embodiment, the third inductor L3 can be arranged as a series inductor as illustrated in FIG. 2C and the first inductor L1 can be arranged as a shunt inductor as illustrated in any one of FIGS. 1 to 2B.

Figure 3:
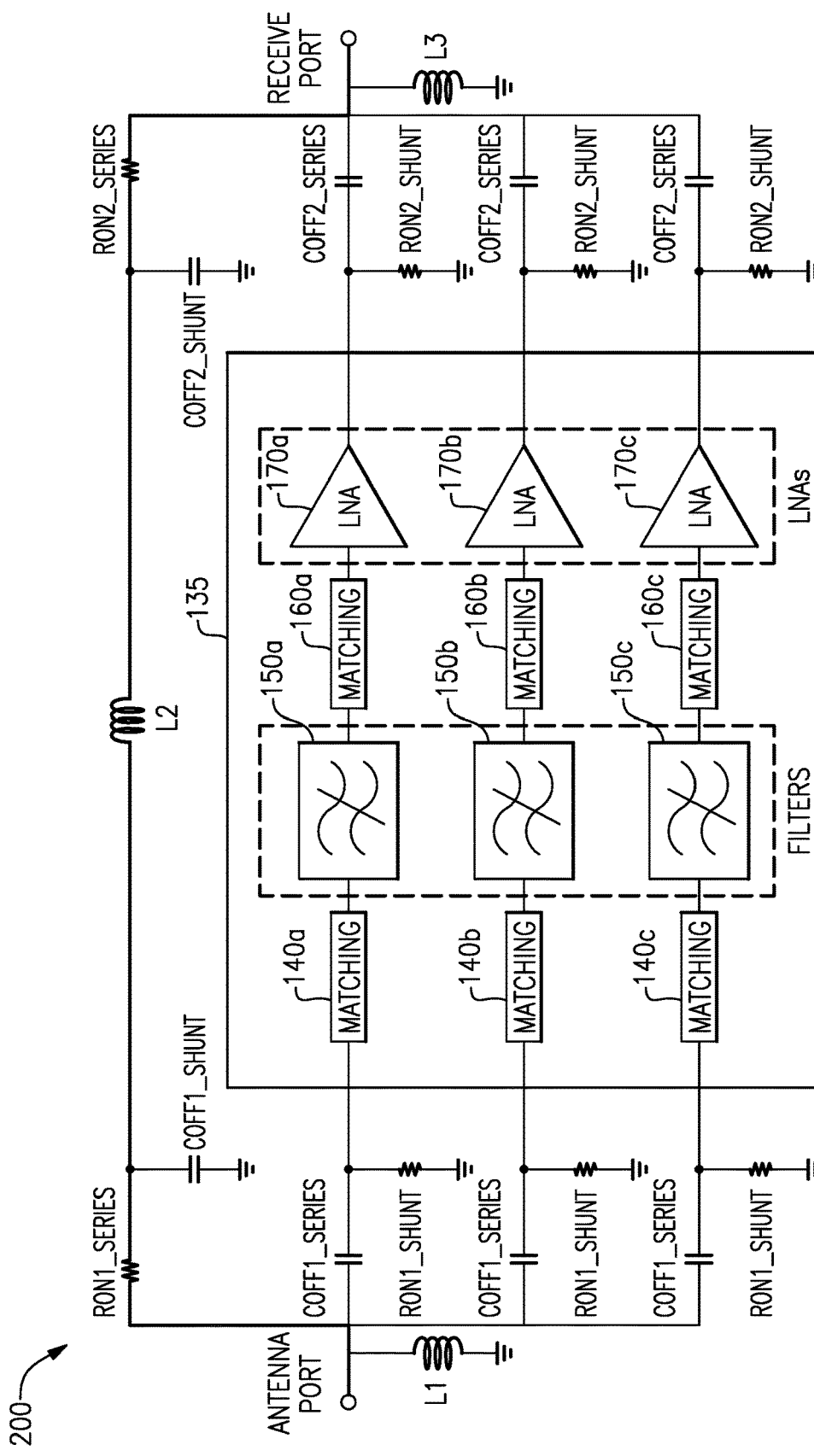
FIG. 3 is a schematic diagram of the diversity module of FIG. 2A with parasitics illustrated.

FIG. 3 is a schematic diagram of the diversity module 200 of FIG. 2A with parasitics illustrated for a first state in which the antenna port is electrically connected to the bypass path 130 by the first switch 110 and the first switch 110 electrically isolates the antenna port from the receive paths 135. The first state can correspond to bypass mode of the diversity module 200. As illustrated in FIG. 3, in the first state, the first switch 110 can have a series capacitance of $C_{OFF1\_SERIES}$ for each of the throws that are unconnected to the bypass path 130. An off state capacitance of the first switch 110 includes the series capacitances $C_{OFF1\_SERIES}$. In addition, in the first state, the first switch 100 can have a shunt resistance $R_{ON1\_SHUNT}$ for each of the throws that are unconnected to the bypass path 130. In the illustrated first switch 110, there are three such series capacitances $C_{OFF1\_SERIES}$ and three shunt resistances $R_{ON1\_SHUNT}$ in the first state.

Similarly, when the second switch 120 electrically connects the bypass path 130 to the receive port and electrically isolates the receive paths 135 from the receive port, the second switch 120 can have a series capacitance of $C_{OFF2\_SERIES}$ corresponding to each of the throws of the second switch 120 that are unconnected to the bypass path 130. An off state capacitance of the second switch 120 includes the series capacitances $C_{OFF2\_SERIES}$. In this state, the second switch 120 can also have shunt resistances $R_{ON2\_SHUNT}$ associated with each throw unconnected to the bypass path 130.

When a particular path of the first switch 110 is on, there can be a series resistance $R_{ON1\_SERIES}$ associated with the on path and a shunt capacitance $C_{OFF1\_SHUNT}$ associated with the particular path that is on. The off state capacitance of the first switch 110 can include the shunt capacitance $C_{OFF1\_SHUNT}$, which is an off state capacitance associated with the on path of the first switch 110. In the first state, the first switch 110 can also have a series resistance $R_{ON1\_SERIES}$ and a shunt capacitance $C_{OFF1\_SHUNT}$ associated with the throw connected to the bypass path 130. Likewise, when the second switch 120 electrically connects the bypass path 130 to the receive port, the second switch can have a series resistance $R_{ON2\_SERIES}$ and a shunt capacitance $C_{OFF2\_SHUNT}$ associated with the throw passing a between the bypass path 130 and the receive port. The shunt capacitance $C_{OFF1\_SHUNT}$ can be considered part of the off state capacitance of the first switch 110. Similarly, the shunt capacitance $C_{OFF2\_SHUNT}$ can be considered part of the off state capacitance of the second switch 120.

Figure 4:
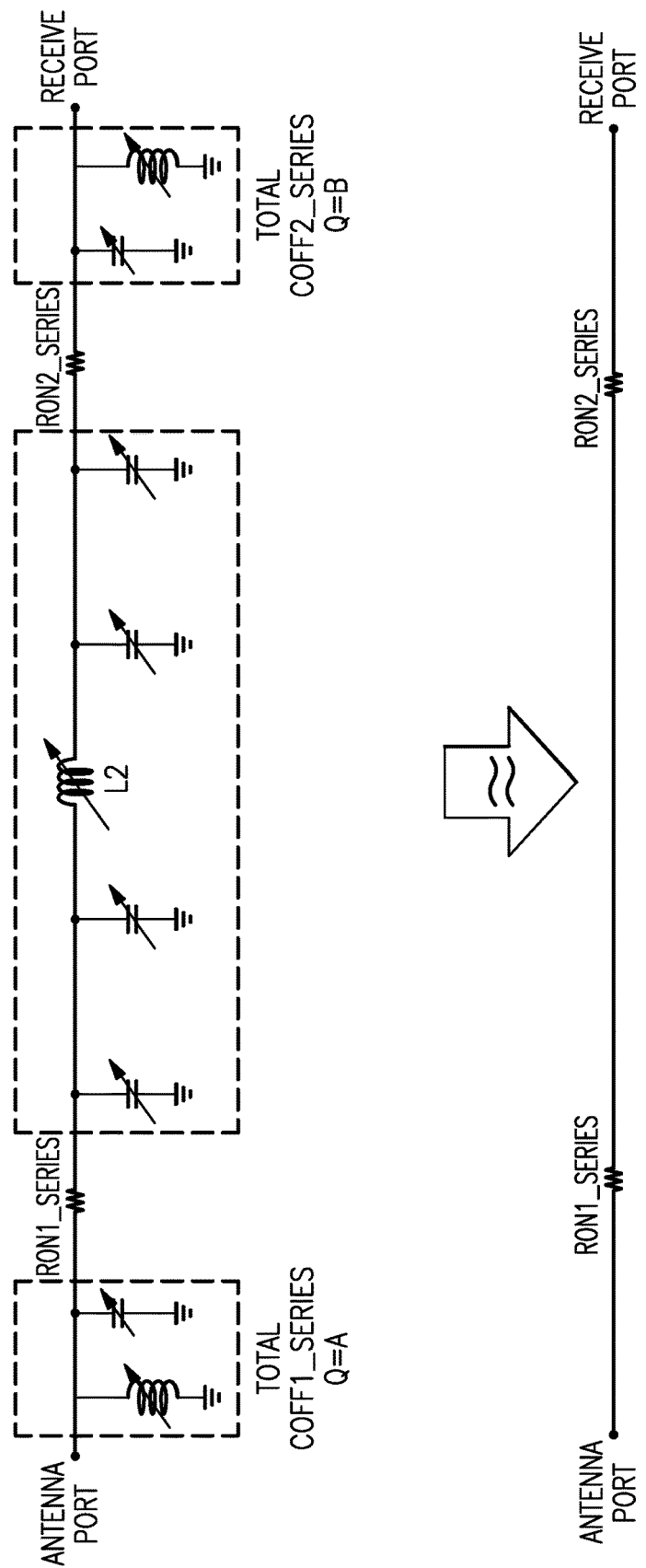
FIG. 4 is a schematic diagram of illustrating parasitics of a bypass path in the diversity module of FIG. 2A.

FIG. 4 is a schematic diagram of illustrating parasitics of a bypass path 130 in bypass mode in the diversity module 200 of FIG. 2A. In FIG. 4, the total series off state capacitance of the first switch 110 for bypass mode is represented by the capacitor having a capacitance of Total $C_{OFF1\_SERIES}$. The inductance of the first inductor L1 can be selected to substantially cancel the total series off state capacitance Total $C_{OFF1\_SERIES}$ of the first switch 110.

As shown in FIG. 4, the shunt off state capacitance of the first switch 110 is represented by a capacitor having a capacitance of $C_{OFF1\_SHUNT}$, the shunt off state capacitance of the second switch 120 is represented by a capacitor having a capacitance of $C_{OFF2\_SHUNT}$, and capacitances of the transmission line of the bypass path 130 on either side of the second inductor L2 are represented by capacitors having a capacitance of $C_{TR/2}$. The second inductor L2 can substantially cancel the capacitance of the transmission line of the bypass path 130. As shown in FIG. 4, the inductance of the second inductor L2 can be selected to also substantially cancel the shunt off state capacitance $C_{OFF1\_SHUNT}$ of the first switch 110 and the shunt off state capacitance $C_{OFF2\_SHUNT}$ of the second switch 120. In some other embodiments, the first inductor L1 can compensate for some or all of the shunt off state capacitance $C_{OFF1\_SHUNT}$ of the first switch 110 and/or the third inductor L3 can compensate for some or all of the shunt capacitance $C_{OFF2\_SHUNT}$ of the second switch 120.

In FIG. 4, the total series off state capacitance of the second switch 120 for bypass mode is represented by the capacitor having a capacitance of Total $C_{OFF2\_SERIES}$. The inductance of the third inductor L3 can be selected to substantially cancel the total series off state capacitance Total $C_{OFF2\_SERIES}$ of the second switch 120.

With the first inductor L1, the second inductor L2, and the third inductor L3, the bypass path 130 can function like the antenna port and the receive port are connected by way of the on resistances of the first switch 110 and the second switch 120. This can result in a relatively low insertion loss for the bypass path 130.

In the embodiments of FIG. 1, FIG. 2B, FIG. 2C the first inductor L1, the second inductor L2, and the third inductor L3 can cancel the same capacitances associated with the bypass path 130 in a similar manner. In one embodiment of FIG. 1, the first inductor L1 can have an inductance selected to substantially cancel both the off state series capacitance Total $C_{OFF1\_SERIES}$ of the first switch 110 and the off state shunt capacitance $C_{OFF1\_SHUNT}$ of the first switch 110. The second inductor L2 of this embodiment can have an inductance selected to substantially cancel the capacitance of the transmission line of the bypass path 130 on both sides of the second inductor L2, which are illustrated as the capacitors having a capacitance of $C_{TR/2}$ in FIG. 4. Additionally, in this embodiment, the third inductor L3 can have an inductance selected to substantially cancel both the off state series capacitance Total $C_{OFF2\_SERIES}$ of the second switch 120 and the off state shunt capacitance $C_{OFF2\_SHUNT}$ of the second switch 120.

Figure 5:
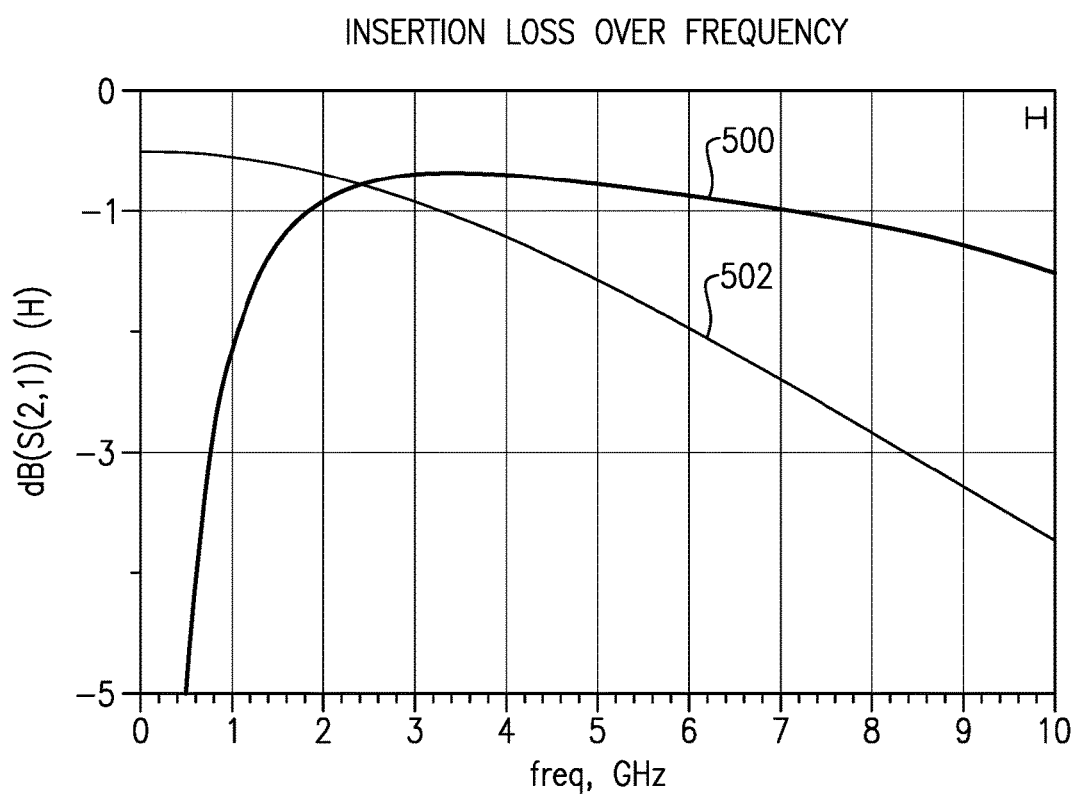
FIG. 5 is a graph comparing insertion loss in the diversity module of FIG. 2A with a previous diversity module.

FIG. 5 is a graph comparing insertion loss in the diversity module 200 of FIG. 2A with a corresponding diversity module without the first inductor L1, the second inductor L2, and the third inductor L3. The curve 500 corresponds to the diversity module 200 and the curve 502 corresponds to the corresponding diversity module without inductive compensation. These curves show that the inductors the diversity module 200 improved insertion loss over a relatively wide frequency range. In generating these curves, a Q factor of 25 for the inductors L2, L2, and L3 was used.

Figure 6:
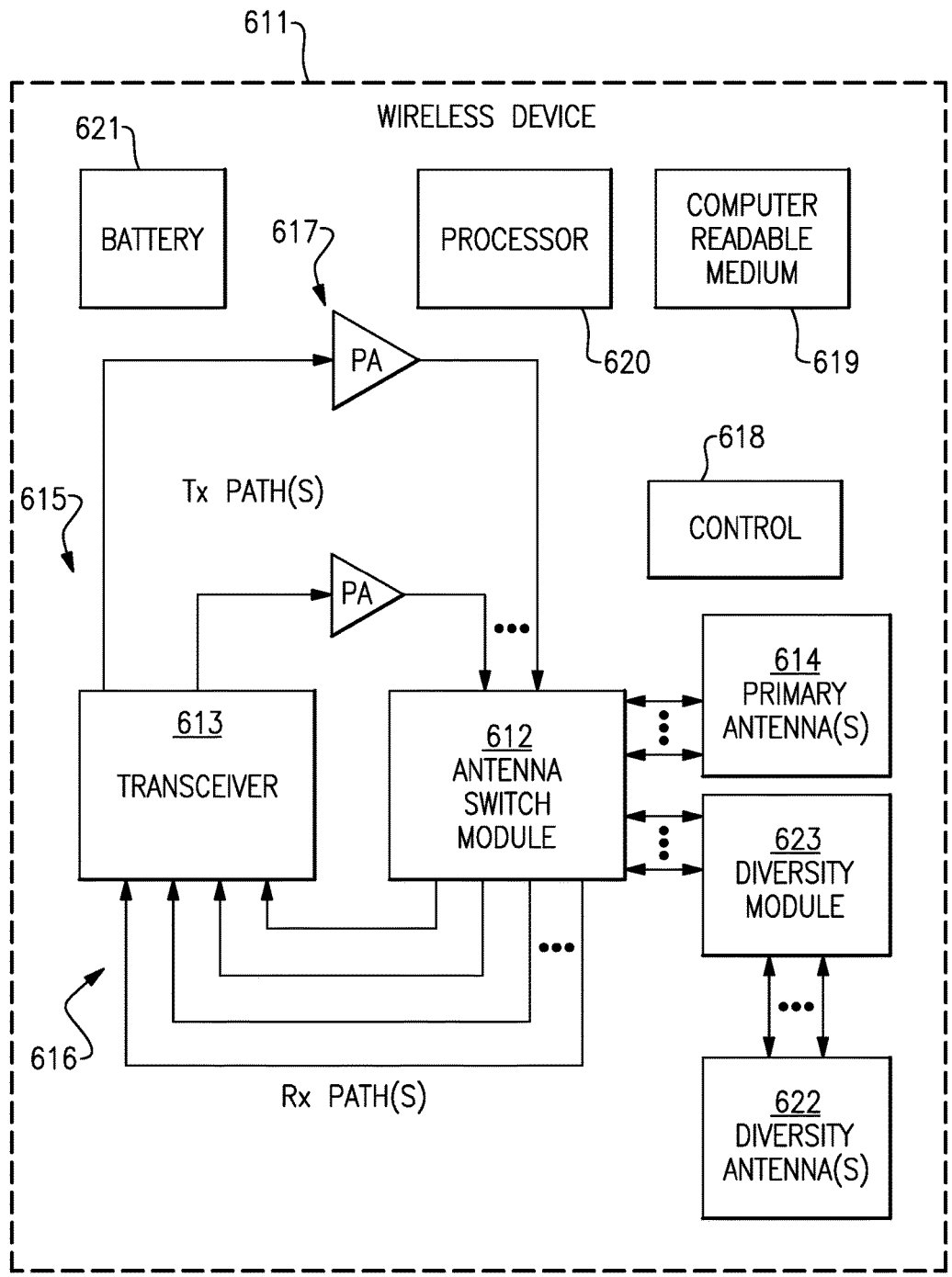
FIG. 6 is a schematic block diagram of a wireless device that includes a diversity module.

FIG. 6 is a schematic block diagram of a wireless device 611 that includes a diversity module 623 that any implement any combination of features of the diversity module 100 of FIG. 1 and/or the diversity module 200 of FIG. 2A. The wireless device 611 is an example application for implementing the diversity modules described herein. The wireless device can be, for example, a smart phone, a tablet computer, a device that is configured to communicate in accordance with LTE and/or a communications standard that accounts for multiple antennas, a device that has an LTE module, or a device that is configured for wireless communication having multiple antennas.

Referring to FIG. 6, a schematic block diagram of one example of a wireless or mobile device 611 will be described. The mobile device 611 can include radio frequency (RF) modules implementing one or more features of the present disclosure. In particular, the mobile device 611 includes a diversity module 623 that can implement any suitable combination of features discussed above associated with decreasing insertion loss of a bypass path.

The example mobile device 611 depicted in FIG. 6 can represent a multi-band and/or multi-mode device such as a multi-band/multi-mode mobile phone. By way of examples, Global System for Mobile (GSM) communication standard is a mode of digital cellular communication that is utilized in many parts of the world. GSM mode mobile phones can operate at one or more of four frequency bands: 850 MHz (approximately 824-849 MHz for transmit, 869-894 MHz for receive), 900 MHz (approximately 880-915 MHz for transmit, 925-960 MHz for receive), 1800 MHz (approximately 1710-1785 MHz for transmit, 1805-1880 MHz for receive), and 1900 MHz (approximately 1850-1910 MHz for transmit, 1930-1990 MHz for receive). Variations and/or regional/national implementations of the GSM bands are also utilized in different parts of the world.

Code division multiple access (CDMA) is another standard that can be implemented in mobile phone devices. In certain implementations, CDMA devices can operate in one or more of 800 MHz, 900 MHz, 1800 MHz and 1900 MHz bands, while certain W-CDMA and Long Term Evolution (LTE) devices can operate over, for example, 22 or more radio frequency spectrum bands.

RF modules of the present disclosure can be used within a mobile device implementing the foregoing example modes and/or bands, and in other communication standards. For example, 3G, 4G, LTE, and Advanced LTE are non-limiting examples of such standards.

In certain embodiments, the mobile device 611 can include an antenna switch module 612, a transceiver 613, one or more primary antennas 614, power amplifiers 617, a control component 618, a computer readable medium 619, a processor 620, a battery 621, one or more diversity antennas 622, and a diversity module 623. The diversity module can implement any combination of features of the diversity modules discussed herein include the diversity module 100 and/or the diversity module 200.

The transceiver 613 can generate RF signals for transmission via the primary antenna(s) 614 and/or the diversity antenna(s) 622. Furthermore, the transceiver 613 can receive incoming RF signals from the primary antenna(s) and/or the diversity antenna(s) 622. It will be understood that various functionalities associated with transmitting and receiving of RF signals can be achieved by one or more components that are collectively represented in FIG. 6 as the transceiver 613. For example, a single component can be configured to provide both transmitting and receiving functionalities. In another example, transmitting and receiving functionalities can be provided by separate components.

In FIG. 6, one or more output signals from the transceiver 613 are depicted as being provided to the antenna switch module 612 via one or more transmission paths 615. In the example shown, different transmission paths 615 can represent output paths associated with different bands and/or different power outputs. For instance, the two different paths shown can represent paths associated with different power outputs (e.g., low power output and high power output), and/or paths associated with different bands. The transmit paths 615 can include one or more power amplifiers 617 to aid in boosting a RF signal having a relatively low power to a higher power suitable for transmission. Although FIG. 6 illustrates a configuration using two transmission paths 615, the mobile device 611 can be adapted to include more or fewer transmission paths 615.

In FIG. 6, one or more received signals are depicted as being provided from the antenna switch module 612 to the transceiver 613 via one or more receiving paths 616. In the example shown, different receiving paths 616 can represent paths associated with different bands. For example, the four example paths 616 shown can represent quad-band capability that some mobile devices are provided with. Although FIG. 6 illustrates a configuration using four receiving paths 616, the mobile device 611 can be adapted to include more or fewer receiving paths 616.

To facilitate switching between receive and/or transmit paths, the antenna switch module 612 can be included and can be used electrically connect a particular antenna to a selected transmit or receive path. Thus, the antenna switch module 612 can provide a number of switching functionalities associated with an operation of the mobile device 611. The antenna switch module 612 can include one or more multi-throw switches configured to provide functionalities associated with, for example, switching between different bands, switching between different power modes, switching between transmission and receiving modes, or some combination thereof. The antenna switch module 612 can also be configured to provide additional functionality, including filtering and/or duplexing of signals.

FIG. 6 illustrates that in certain embodiments, the control component 618 can be provided for controlling various control functionalities associated with operations of the antenna switch module 612, the diversity module 623, and/or other operating component(s). For example, the control component 618 can provide control signals to the antenna switch module 612 and/or the diversity module 623 to control electrical connectivity to the primary antenna(s) 614 and/or diversity antenna(s) 622.

In certain embodiments, the processor 620 can be configured to facilitate implementation of various processes on the mobile device 611. The processor 620 can be a general purpose computer, special purpose computer, or other programmable data processing apparatus. In certain implementations, the mobile device 611 can include a computer-readable memory 619, which can include computer program instructions that may be provided to and executed by the processor 620.

The battery 621 can be any suitable battery for use in the mobile device 611, including, for example, a lithium-ion battery.

The illustrated mobile device 611 includes the diversity antenna(s) 622, which can help improve the quality and reliability of a wireless link. For example, including the diversity antenna(s) 622 can reduce line-of-sight losses and/or mitigate the impacts of phase shifts, time delays and/or distortions associated with signal interference of the primary antenna(s) 614.

As shown in FIG. 6, the diversity module 623 is electrically connected to the diversity antenna(s) 622. The diversity module 623 can be used to process signals received and/or transmitted using the diversity antenna(s) 622. In certain configurations, the diversity module 623 can be used to provide filtering, amplification, switching, and/or other processing. The diversity module 623 can include the bypass path 130. One of more of the inductors L1, L2, or L3 can also be included in the diversity module 623. The diversity module 623 can include the first switch 110, the second switch 120, the bypass path 130, and one or more transmit and/or receive paths enclosed within a single package. One of more of the inductors L1, L2, or L3 can also be included within the single package.

Some of the embodiments described above have provided examples in connection with diversity modules. However, the principles and advantages discussed herein can be implemented in any other systems or apparatus that can benefit from inductive compensation for a bypass path. Such a bypass path can bypass receive and/or transmit paths.

Such a system or apparatus can be implemented in various electronic devices. Examples of the electronic devices can include, but are not limited to, consumer electronic products, parts of the consumer electronic products, electronic test equipment, etc. Examples of the electronic devices can also include, but are not limited to, RF modules such as diversity modules and/or front end modules, memory chips, memory modules, circuits of optical networks or other communication networks, and disk driver circuits. The consumer electronic products can include, but are not limited to, a mobile phone such as a smart phone, a telephone, a television, a computer monitor, a computer, a hand-held computer, a laptop computer, a tablet computer, a wearable computing device such as a smart watch, a personal digital assistant (PDA), a PC card, a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods, apparatus, and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A diversity module with bypass path loss reduction, the diversity module comprising:
   an antenna port configured to receive a radio frequency signal;
   switches including a first multi-throw switch coupled to the antenna port and a second multi-throw switch, the first multi-throw switch being configurable into at least a first state and a second state;
   a receive path between the first multi-throw switch with the multi-throw second switch, the receive path including a low noise amplifier, and the first multi-throw switch configured to electrically connect the antenna port to the receive path in the second state and to electrically isolate the bypass path from the antenna port in the second state; and
   a bypass path between the first multi-throw switch and the second multi-throw switch, the bypass path including an inductor coupled in series between the first multi-throw switch and the second multi-throw switch, the inductor configured to cause insertion loss of the bypass path to be reduced, the bypass path arranged to bypass the receive path, and the first multi-throw switch configured to electrically connect the antenna port to the bypass path in the first state and to electrically isolate the receive path from the antenna port in the first state.

2. The diversity module of claim 1 further comprising a second inductor configured to compensate for an off state capacitance of the first multi-throw switch.

3. The diversity module of claim 2 wherein the first multi-throw switch is coupled between the second inductor and the bypass path.

4. The diversity module of claim 2 wherein the second inductor has an adjustable inductance.

5. The diversity module of claim 2 wherein the second inductor is a shunt inductor.

6. The diversity module of claim 2 further comprising a third inductor configured to compensate for an off state capacitance of the second multi-throw switch.

7. The diversity module of claim 1 wherein the first multi-throw switch includes four throws.

8. The diversity module of claim 7 wherein the second multi-throw switch includes four throws.

9. The diversity module of claim 1 further comprising a second receive path between the first multi-throw switch with the multi-throw second switch, the second receive path including a second low noise amplifier.

10. The diversity module of claim 9 wherein the first receive path includes a first band pass filter, the second receive path includes a second band pass filter, and the first band pass filter and the second band pass filter are arranged to pass different frequency bands.

11. A wireless communication device with bypass path loss reduction, the wireless communication device comprising:
    a primary antenna;
    a diversity antenna; and
    a diversity module configured to receive a radio frequency signal from the diversity antenna, the diversity module including a bypass path and a receive path, the bypass path including an inductor coupled in series between multi-throw switches and configured to cause insertion loss of the bypass path to be reduced, the receive path including a low noise amplifier coupled between the multi-throw switches, the bypass path arranged to bypass the receive path, and a first switch of the multi-throw switches configured to (a) electrically connect the diversity antenna to the bypass path and electrically isolate the receive path from the diversity antenna in a first state and (b) electrically connect the diversity antenna to the receive path and electrically isolate the bypass path from the diversity antenna in a second state.

12. The wireless communication device of claim 11 further comprising an antenna switch module in communication with the diversity antenna by way of the diversity module.

13. The wireless communication device of claim 12 wherein the antenna switch module is in communication with the primary antenna.

14. The wireless communication device of claim 11 wherein the diversity module includes a second inductor configured to compensate for an off state capacitance associated with a multi-throw switch of the multi-throw switches.

15. The wireless communication device of claim 11 wherein the diversity module includes a second receive path associated with a different frequency band than the receive path.

16. A method of reducing bypass path insertion loss, the method comprising:
    receiving a radio frequency signal at an input of a diversity module;
    operating the diversity module in a bypass mode in which the input of the diversity module is coupled to an output of the diversity module by way of a bypass path that electrically connects a first multi-throw switch with a second multi-throw switch, the bypass path arranged to bypass a receive path of the diversity module; and
    compensating for an off state capacitance of the first multi-throw switch in the bypass mode to cause insertion loss associated with the bypass path to be reduced, the off state capacitance of the first multi-throw switch being associated with electrically isolating the receive path of the diversity module from the input of the diversity module in the bypass mode.

17. The method of claim 16 further comprising compensating for a capacitance of a transmission line of the bypass path with a series inductor.

18. The method of claim 16 wherein the off state capacitance of the first multi-throw switch includes an off state series capacitance associated with a throw of the first multi-throw switch that is unconnected to the bypass path.

19. The method of claim 16 further comprising compensating for an off state capacitance of the second multi-throw switch in the bypass mode.

20. The method of claim 16 wherein the receiving includes receiving the radio frequency signal from a diversity antenna of a mobile phone.

* * * * *